(12) United States Patent
Liu et al.

(10) Patent No.: US 10,208,655 B2
(45) Date of Patent: Feb. 19, 2019

(54) METHOD AND APPARATUS FOR CONTROLLING AN INTERNAL COMBUSTION ENGINE

(71) Applicant: GM Global Technology Operations LLC, Detroit, MI (US)

(72) Inventors: Jim Liu, Pudong (CN); Yongsheng He, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 3 days.

(21) Appl. No.: 15/557,614

(22) PCT Filed: Mar. 13, 2015

(86) PCT No.: PCT/CN2015/074196
§ 371 (c)(1),
(2) Date: Sep. 12, 2017

(87) PCT Pub. No.: WO2016/145569
PCT Pub. Date: Sep. 22, 2016

(65) Prior Publication Data
US 2018/0051622 A1    Feb. 22, 2018

(51) Int. Cl.
*F01L 1/34*    (2006.01)
*F02B 29/08*    (2006.01)
(Continued)

(52) U.S. Cl.
CPC ............ *F02B 29/08* (2013.01); *F02B 25/145* (2013.01); *F02D 13/0207* (2013.01); *F02D 13/0219* (2013.01); *F02D 13/0261* (2013.01); *F02D 41/0007* (2013.01); *F02D 41/1453* (2013.01); *F02D 41/1456* (2013.01);
(Continued)

(58) Field of Classification Search
CPC ............ F02D 41/1453; F02D 41/1458; F02D 41/2451; F02D 41/0007; F02D 13/0207; F02D 13/0219; F02D 29/08; F02D 41/1456; F02D 2200/1002; F02D 2041/001; F02D 2200/0402; F02D 2200/0406;
(Continued)

(56) References Cited

U.S. PATENT DOCUMENTS

2011/0253116 A1*  10/2011  Eiraku .................... F02D 23/02
                                                              123/676
2014/0000554 A1    1/2014  Tsuyuki et al.

FOREIGN PATENT DOCUMENTS

| JP | 2005220757 A | 8/2005 |
| JP | 2008101502 A | 5/2008 |
| JP | 2009197759 A | 3/2009 |

OTHER PUBLICATIONS

International Search Report on International Application No. PCT/CN2015/074196, dated Dec. 17, 2015.

* cited by examiner

*Primary Examiner* — Zelalem Eshete
(74) *Attorney, Agent, or Firm* — Quinn IP Law

(57) ABSTRACT

An internal combustion engine is described, and includes a method for operating that includes determining an observed carbon monoxide (CO) ratio in an exhaust gas feedstream, determining an observed in-cylinder scavenging based upon the observed CO ratio in the exhaust gas feedstream, and controlling, by a controller, control states for the variable cam phasing system to control opening times of engine intake valves in relation to closing times of engine exhaust valves based upon the observed in-cylinder scavenging.

20 Claims, 4 Drawing Sheets

(51) Int. Cl.
  *F02D 41/14* (2006.01)
  *F02D 41/24* (2006.01)
  *F02D 41/00* (2006.01)
  *F02B 25/14* (2006.01)
  *F02D 13/02* (2006.01)
  F02B 23/10 (2006.01)
  F02M 26/21 (2016.01)

(52) U.S. Cl.
  CPC ..... *F02D 41/1458* (2013.01); *F02D 41/2451* (2013.01); *F02B 23/104* (2013.01); *F02D 2041/001* (2013.01); *F02D 2200/0402* (2013.01); *F02D 2200/0406* (2013.01); *F02D 2200/0614* (2013.01); *F02D 2200/1002* (2013.01); *F02M 26/21* (2016.02); *Y02T 10/144* (2013.01); *Y02T 10/18* (2013.01)

(58) Field of Classification Search
  CPC ............ F02D 2200/0614; F02B 25/145; F02B 23/104; F02M 26/21; Y02T 10/18; Y02T 10/144
  See application file for complete search history.

US 10,208,655 B2

METHOD AND APPARATUS FOR CONTROLLING AN INTERNAL COMBUSTION ENGINE

TECHNICAL FIELD

The present disclosure relates to internal combustion engines and more particularly to control systems therefor.

BACKGROUND

Internal combustion engines combust an air and fuel mixture within cylinders to drive pistons, which produces torque. Air flow into a spark-ignition engine is regulated via an operator-controllable throttle, and fuel flow is controlled to achieve an air/fuel ratio that is responsive to an operate request for power. Turbocharged engines pressurize air that is drawn into an intake manifold. Thus, a pressure difference may exist between the air in the intake manifold, i.e., pre-combustion and exhaust gas in an exhaust manifold, i.e. post-combustion. For example, the intake manifold pressure may be higher than the exhaust manifold pressure.

Engines that include variable cam phasing and/or variable valve control may selectively open intake and exhaust valves. For example only, an engine may selectively open intake and exhaust valves via cam phasers or energized solenoids. Opening intake and exhaust valves simultaneously in a turbocharged engine may allow higher pressure air in the intake manifold to flow through the cylinder towards the lower pressure exhaust gas in the exhaust manifold.

SUMMARY

An internal combustion engine is described, and includes a method for operating that includes determining an observed carbon monoxide (CO) ratio in an exhaust gas feedstream, determining a magnitude of in-cylinder scavenging based upon the observed CO ratio in the exhaust gas feedstream, and controlling, by a controller, control states for the variable cam phasing system to control opening times of engine intake valves in relation to closing times of engine exhaust valves based upon the observed in-cylinder scavenging ratio.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 5-1 graphically shows the magnitude of engine torque in relation to intake cam phasing and exhaust cam phasing for the engine described with reference to FIG. 1, in accordance with the disclosure; and FIG. 5-2 graphically shows the magnitude of a scavenging ratio in relation to intake cam phasing and exhaust cam phasing for the engine described with reference to FIG. 1, in accordance with the disclosure.

DETAILED DESCRIPTION

Figure 1:
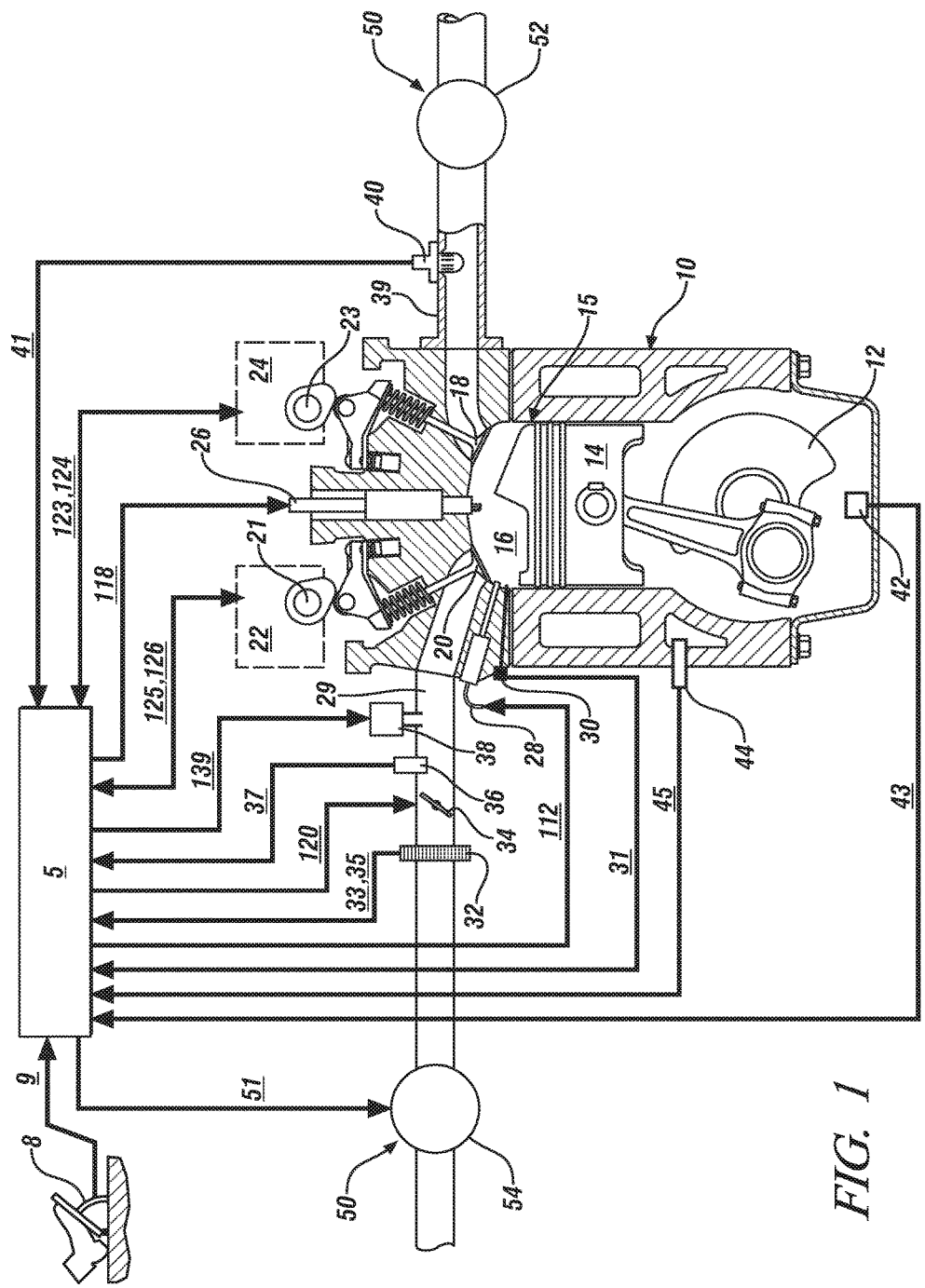
FIG. 1 schematically illustrates a cutaway side-view sketch of an internal combustion engine and an accompanying controller, in accordance with the disclosure.

The following description is merely exemplary in nature and is in no way intended to limit the disclosure, its application, or uses. Like reference numerals indicate like or corresponding elements throughout the several drawings. Terms and acronyms used herein include engine speed in revolutions per minute (RPM), engine piston position and crankshaft rotational position in rotational degrees (deg) in terms of top-dead-center (TDC), a before-TDC rotational position (deg bTDC), an after-TDC rotational position (deg aTDC), and a bottom-dead-center position (BDC). The term 'engine operating parameter' refers to any quantifiable value related to engine operation that may be directly measured, inferred, estimated or otherwise determined by a controller. The term 'control state' refers to any controllable state for an actuator component or system that may be commanded by a controller.

Referring now to the drawings, wherein the depictions are for the purpose of illustrating certain exemplary embodiments only and not for the purpose of limiting the same, FIG. 1 schematically illustrates a cutaway side-view sketch of an internal combustion engine (engine) 10 and an accompanying controller 5 that have been constructed in accordance with an embodiment of this disclosure. For illustration purposes, a single representative cylinder 15 is shown. The engine 10 may include multiple cylinders. For example only, the engine 10 may include 2, 3, 4, 5, 6, 8, 10, and/or 12 cylinders. The engine 10 as shown is configured as a spark-ignition direct injection internal combustion engine, and may be configured to operate primarily at a stoichiometric air/fuel ratio in one embodiment. The disclosure may be applied to various internal combustion engine systems and combustion cycles.

The exemplary engine 10 may include a multi-cylinder four-stroke internal combustion engine having reciprocating pistons 14 slidably movable in cylinders 15 that define variable volume combustion chambers 16. Each piston 14 connects to a rotating crankshaft 12 by which linear reciprocating motion translates to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow (MAF) 33 and intake air temperature (TAT) 35. A throttle valve 34 preferably includes an electronically controlled device that is used to control airflow to the engine 10 in response to an airflow control state (ETC) 120 from the controller 5. A pressure sensor 36 in the intake manifold 29 is configured to monitor manifold absolute pressure (MAP) 37 and barometric pressure. The engine 10 may include an external flow passage that recirculates exhaust gases from engine exhaust to the intake manifold 29, having a flow control valve referred to as an exhaust gas recirculation (EGR) valve 38 in one embodiment. The controller 5 controls mass flow of exhaust gas to the intake manifold 29 by controlling the EGR valve 38 via an EGR control state 139. An intake air compressor system 50 is configured to control flow of intake air to the engine 10 in response to a compressor boost control state 51, and may include a variable-geometry turbocharger (VGT) system that includes a turbine device 52 located in the exhaust gas stream rotatably coupled to an intake air compressor device 54 that is configured to increase flow of engine intake air. An air intercooler device may be fluidly located between the intake air compressor device 54 and the engine intake manifold 29 in one embodiment. Alternatively, the intake air compressor system 50 may include a shaft-driven or electrically-driven supercharger device, or another suitable air compressing system. The four-stroke engine cycle includes repetitively executed cycles including intake, compression, power and exhaust strokes. The exhaust manifold 39 and the VGT turbine device 52 fluidly couple to one or a plurality of exhaust gas purifiers, which may include any one of or a combination of oxidation and reduction catalytic converters, NOx traps, selective catalytic reduction devices and other devices for purifying the exhaust feed stream prior to expulsion to ambient air. Each of the exhaust gas purifiers has requirements related to mechanical and thermal parameters within which they are to operate to maximize their service life. Such parameters include, by way of example, maximum vibration limits, quantity of vibration cycles, maximum thermal exposures including time-at-temperature limits, and others known to those skilled in the art. Operating outside such mechanical and thermal parametric requirements may reduce the service life of the exhaust gas purifiers.

Airflow from the intake manifold 29 into the combustion chamber 16 is controlled by one or more intake valve(s) 20 per cylinder. Exhaust flow out of the combustion chamber 16 to an exhaust manifold 39 is controlled by one or more exhaust valve(s) 18 per cylinder. The engine 10 is equipped with systems to control and adjust openings and closings of either or both of the intake and exhaust valves 20 and 18, including adjusting cam phasings of only the intake valves 20, adjusting cam phasings of only the exhaust valves 18, adjusting cam phasings of both the intake valves 20 and the exhaust valves 18, adjusting magnitude of valve lift of the intake valves 20, adjusting magnitude of valve lift of the exhaust valves 18, adjusting magnitude of valve lift of the intake valves 20 and the exhaust valves 18, and combinations thereof. In one embodiment, the openings and closings of the intake and exhaust valves 20 and 18 may be controlled and adjusted by controlling intake and exhaust variable cam phasing/variable lift control (VCP/VLC) devices 22 and 24, respectively. The intake and exhaust VCP/VLC devices 22, 24 control openings and closings of the intake and exhaust valves 20 and 18, including controlling rotations of an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20, 18 to positions of the crankshaft 12 and the pistons 14. Devices and control routines associated with intake and exhaust VCP/VLC devices 22, 24 may be any suitable device or combination of devices, and include, by way of non-limiting examples, cam phasers, two-step lifters and solenoid-controlled valve actuators, among others.

The intake VCP/VLC device 22 preferably includes a mechanism operative to switch and control valve lift of the intake valve(s) 20 in response to a control state (iVLC) 125 and variably adjust and control phasing of the intake camshaft 21 for each cylinder 15 in response to a control state (iVCP) 126. The exhaust VCP/VLC device 24 preferably includes a controllable mechanism operative to variably switch and control valve lift of the exhaust valve(s) 18 in response to a control state (eVLC) 123 and variably adjust and control phasing of the exhaust camshaft 23 for each cylinder 15 in response to a control state (eVCP) 124. The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing mechanism to control and adjust phasing (i.e., relative timing) of openings and closings of the intake valve(s) 20 and the exhaust valve(s) 18, respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the controller 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control states eVLC 123, eVCP 124, iVLC 125, and iVCP 126. In one embodiment, the VCP/VLC devices 22, 24 are only capable of executing intake and exhaust variable cam phasings.

The engine 10 preferably employs a direct-injection fuel injection system including a plurality of high-pressure fuel injectors 28 that are employed to directly inject a mass of fuel into one of the combustion chambers 16 in response to an injector pulsewidth control state (INJ_PW) 112 from the controller 5. The fuel injectors 28 are supplied pressurized fuel from a fuel distribution system. The engine 10 employs a spark-ignition system by which spark energy may be provided to a spark plug 26 for igniting or assisting in igniting cylinder charges in each of the combustion chambers 16 in response to a spark control state (IGN) 118 from the controller 5.

The engine 10 may be equipped with various sensing devices for monitoring engine operation, including a crank sensor 42 having an output indicative of crankshaft rotational position, i.e., crank angle, and engine speed (RPM) 43. A temperature sensor 44 is configured to monitor coolant temperature 45. In one embodiment, an in-cylinder combustion sensor 30 may be employed to dynamically monitor combustion 31 during each combustion cycle, and may be a cylinder pressure sensor operative to monitor in-cylinder combustion pressure in one embodiment. An exhaust gas sensor 40 may be employed to monitor an exhaust gas parameter 41 of the exhaust gas feedstream, e.g., air/fuel ratio (AFR). The combustion and the engine speed 43 are monitored by the controller 5 to dynamically determine combustion timing, i.e., timing of combustion pressure relative to the crank angle of the crankshaft 12 for each cylinder 15 for each combustion cycle. It is appreciated that combustion timing may be determined by other methods. The controller 5 may communicate with various sensing devices for monitoring operator requests, including, e.g., an accelerator pedal sensor 8 that generates an operator torque request 9. Other related operator requests, e.g., vehicle braking and cruise control may be comprehended by and included in the operator torque request 9.

The term controller and related terms control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component(s) is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The term "calibration" and related terms refer to a routine, in the form of an executable equation, lookup table, or other suitable form, in which a known state of a first parameter may be employed to determine a state of a second parameter, preferably due to a causal relation between the first and second parameters. The known state of the first parameter may be determined by direct measurement or estimation from other measured or observed parameters.

The controller 5 is shown as a unitary element. It is appreciated that the controller 5 may include a plurality of controllers that are communicatively coupled via a bus, direct wiring or another mechanism. Such controllers may include a fuel controller that controls operation of the fuel injector 28 to inject fuel into the combustion chamber, a spark actuator controller that controls energizing the spark plug 26 to ignite the A/F mixture, a valve actuation controller that controls openings and/or closings of the intake valves and/or exhaust valves, a turbocharger boost controller for controlling waste gate position and turbine geometry, an EGR controller and an ETC controller.

Scavenging is an engine control process wherein an intake valve opening overlaps with a corresponding exhaust valve opening for a cylinder such that intake air flows through the combustion chamber and displaces all or a portion of in-cylinder residual combustion gases from a previous combustion cycle, sending the displaced residual combustion gases into the exhaust gas feedstream. A fraction of fresh intake air may also go through the cylinder without participating combustion and exit from the exhaust valve to exhaust gas stream. Such operation results in an in-cylinder fuel/air charge having a greater amount of fuel while maintaining a global stoichiometric air/fuel ratio operation, which may increase engine output power. Scavenging also reduces in-cylinder hot residual gas and knock propensity, and thus may result in improved engine combustion. Scavenging may be limited to spark-ignition, direct-injection (SIDI) engines or other injector configurations that control fuel injection timing independently of intake valve opening. Scavenging may also increase total engine airflow, which can positively affect operation of a turbocharger due to the increased engine airflow. Such positive improvements in turbocharger operation include reduced turbocharger response lag times and improved time-to-torque. Scavenging provides an operational benefit to engine operation primarily at low engine speeds with associated low engine airflow, and thus may be enabled at low RPM levels when a torque request exceeds an available torque reserve. Scavenging is accomplished by controlling opening and/or closing time(s) of the intake valve(s) and the exhaust valve(s), including controlling to increase valve overlap to increase the amount of scavenging. The engine may switch between a normal cam phaser schedule and a scavenging cam phaser schedule based on the torque request, the available torque output, and the engine RPM level. Fuel control is enabled to achieve the desirable global or exhaust A/F ratio with and without scavenging. To achieve stoichiometric A/F ratio, spark control may also be modified in one embodiment.

Figure 2:
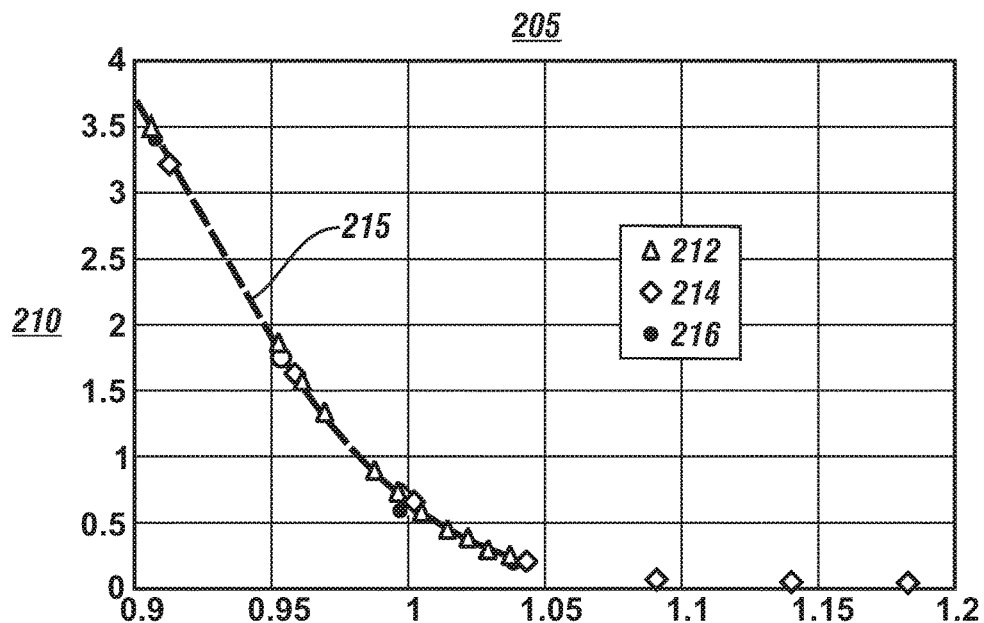
FIG. 2 graphically shows a datagraph associated with operating an embodiment of the engine described with reference to FIG. 1, including data indicating an amount of carbon monoxide (CO) in the exhaust gas feedstream in relation to an exhaust gas air/fuel ratio or lambda (global-$\lambda$) for different engine speed/load operating points, in accordance with the disclosure.

FIG. 2 graphically shows a datagraph 205 associated with operating an embodiment of the engine 10 described with reference to FIG. 1, including data indicating an amount of carbon monoxide (CO) 210 in the exhaust gas feedstream in percent of volume in relation to an exhaust gas air/fuel ratio or exhaust lambda (global-λ) 220 for different engine speed/load operating points 212, 214, and 216. The lambda term is a known parameter that indicates an observed air/fuel ratio that has been normalized with stoichiometric air/fuel ratio, wherein the observed air/fuel ratio is directly measured with a sensor, derived from engine operating conditions, or otherwise determined. The engine 10 operates with the intake and exhaust valves controlled such that there is no valve overlap occurring between exhaust and intake strokes of the combustion cycle, i.e., without scavenging. A resulting % CO-global-λ relationship 215 indicates that the percentage of exhaust CO (% CO) changes with a change in exhaust air/fuel ratio (global-λ) independently of engine speed and load. The different engine speed/load operating points 212, 214, and 216 are selected for purposes of illustration, and are a subset of the data collected to establish the % CO-global-λ relationship 215 for the exemplary 10. The % CO-global-λ relationship 215 is illustrative of the relationship. Magnitudes of % CO and global-λ and the associated relationship may be determined during engine development or under known conditions, and may be specific to an embodiment of the engine 10. The resulting % CO-global-λ relationship 215 may be reduced to a calibration, e.g., calibration 200, which is referenced in FIG. 4. The resulting % CO-global-λ relationship 215 may be employed in estimating an in-cylinder air/fuel ratio or lambda (in-cylinder-λ), which indicates the magnitude of scavenging, as described herein.

Figure 3:
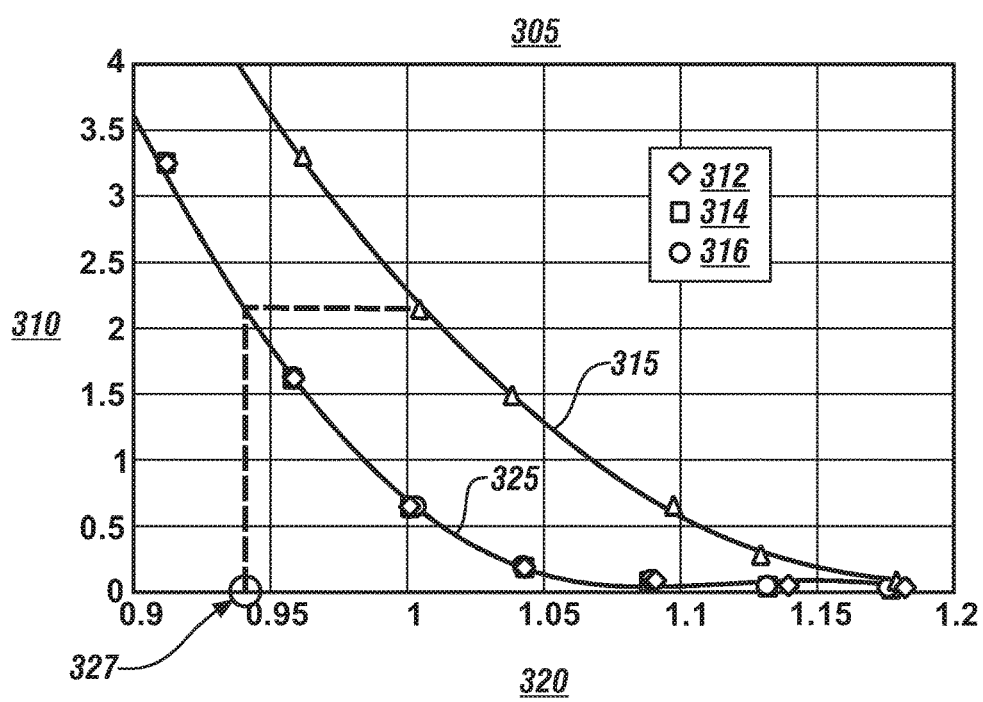
FIG. 3 graphically shows a datagraph associated with operating an embodiment of the engine described with reference to FIG. 1, including data indicating exhaust carbon monoxide in relation to lambda for engine operation at a known speed and at different engine load operating points including operating the engine with and without scavenging, in accordance with the disclosure.

FIG. 3 graphically shows a datagraph 305 associated with operating an embodiment of the engine 10 described with reference to FIG. 1, including exhaust carbon monoxide (CO) 310, in percent, by volume (% CO) in relation to exhaust lambda (global-λ) 320 for engine operation at a known speed, e.g., 1500 RPM, and at different engine load operating points 312, 314 and 316. Line 325 indicates a first relationship between % CO and global-λ and includes the engine 10 operating with the intake and exhaust valves controlled such that there is no valve overlap occurring between exhaust and intake strokes of the combustion cycle, i.e., without scavenging. Line 315 indicates a second relationship between % CO and global-λ and includes the engine 10 operating with the intake and exhaust valves controlled such that there is some valve overlap occurring between exhaust and intake strokes of the combustion cycle, i.e., with some scavenging. Line 315 is associated with a specific scavenging ratio, and is illustrative. By way of example to explain an application of the data shown, at a stoichiometric air/fuel ratio, i.e., global-λ=1, the engine 10 generates a magnitude of % CO of about 2.1%, as shown on the vertical axis. This magnitude of % CO of about 2.1% translates to an in-cylinder-λ value of about 0.94 as indicated by point 327 when operating the engine at 1500 RPM regardless of the engine load. Other lines showing relationships between % CO and global-λ may be developed by operating the engine 10 at each of a plurality of scavenging ratios over a range between 0% scavenging and a maximum, hardware-limited scavenging ratio. The global-Δ value directly translates to the in-cylinder-λ value when measured without valve overlap, i.e., no scavenging, while operating an engine under warmed-up, steady state conditions. This correlation between the global-λ value and the in-cylinder-λ value may be employed to develop a calibration, e.g., the calibration 300 referenced in FIG. 4.

The relationships shown by Line 315 and 325 can be employed to determine a magnitude of the in-cylinder lambda during engine operating conditions that include scavenging at a scavenging ratio by monitoring the exhaust gas to determine % CO in the exhaust gas feedstream. The in-cylinder lambda value (in-cylinder-λ) may also be determined as follows:

$$\text{in-cylinder-}\lambda = A(\% \ CO)^3 + B(\% \ CO)^2 + C(\% \ CO) + D \quad [1]$$

wherein A, B, C and D are scalar numbers that are derived for a specific embodiment of the engine 10.

Figure 4:
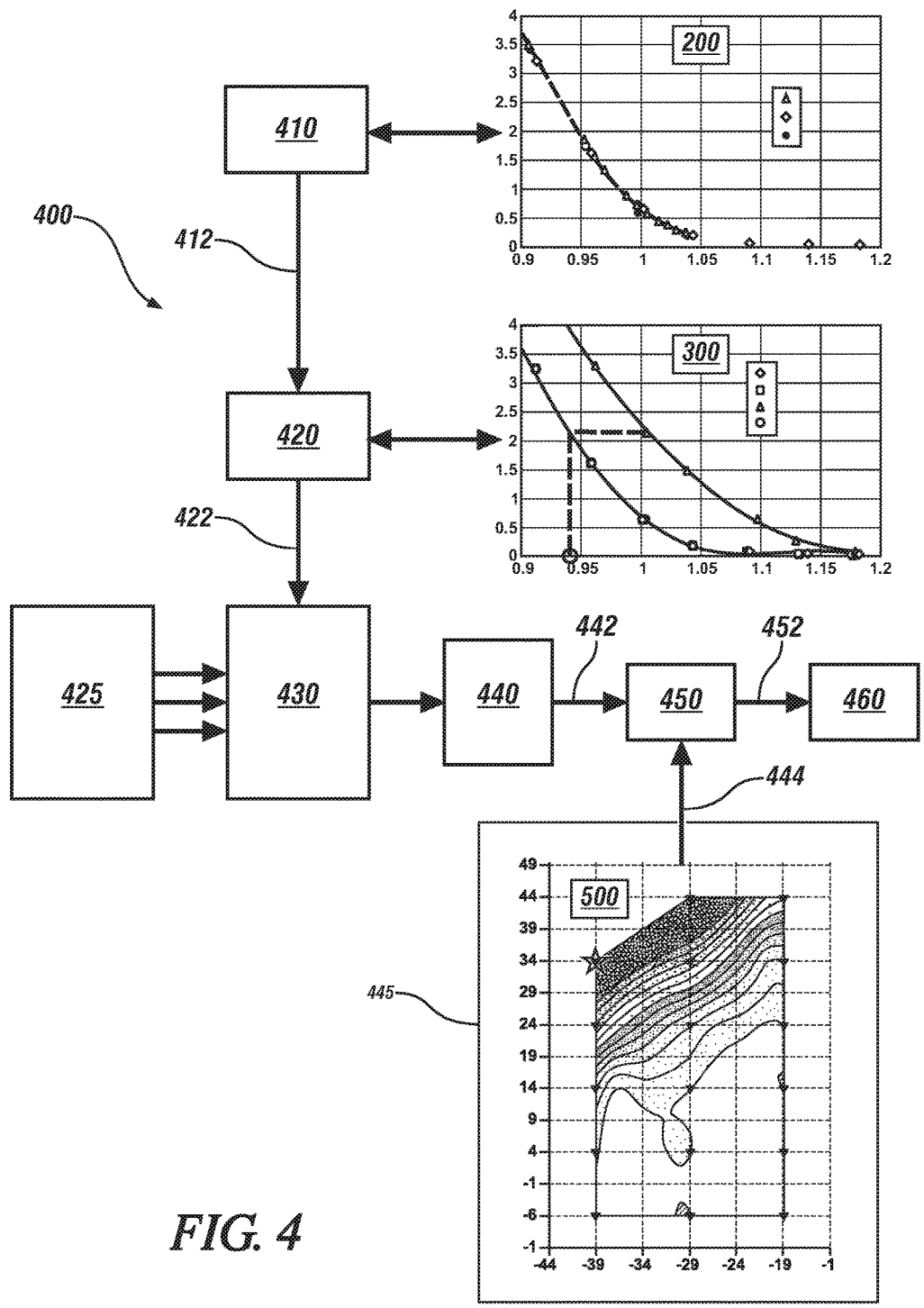
FIG. 4 schematically shows a scavenging control routine for controlling operation of an embodiment of the engine to achieve a preferred scavenging ratio employing the relationship described with reference to FIG. 2, a first relationship between exhaust carbon monoxide in relation to a global lambda with the engine operating with no valve overlap, i.e., no scavenging, and a second relationship between exhaust carbon monoxide in relation to global lambda with the engine operating with valve overlap, i.e., with scavenging as described with reference to FIG. 3, in accordance with the disclosure.

FIG. 4 schematically shows a scavenging control routine 400 that includes controlling operation of an embodiment of the engine 10 to achieve a preferred scavenging ratio employing the first relationship between % CO and global-λ with the embodiment of the engine 10 operating with no valve overlap, i.e., no scavenging and the second relationship between % CO and global-λ with the embodiment of the engine 10 operating with valve overlap, i.e., with scavenging, as described with reference to FIG. 3. Controlling the embodiment of the engine 10 including executing the scavenging control routine 400 may result in improved combustion phasing and increased engine torque under low-speed, high-load conditions, e.g., in response to a wide-open-throttle (WOT) command. The scavenging control routine 400 may be executed as a single routine in one of the controllers, or may be executed as a plurality of routines that are located in one or more non-transitory memory component(s) and executed in one or more of the controllers. Table 1 is provided as a key wherein the numerically labeled blocks and the corresponding functions are set forth as follows, corresponding to the scavenging control routine 400.

TABLE 1

| BLOCK | BLOCK CONTENTS |
|---|---|
| 410 | Determine % CO based upon either direct CO measurement with exhaust gas sensor, or CO predictions with algorithms (virtual sensor) |
| 420 | Determine in-cylinder λ based upon % CO |
| 425 | Monitor engine operating parameters including engine fueling, MAF, air/fuel ratio |
| 430 | Determine in-cylinder trapped air mass and scavenging air mass |
| 440 | Determine observed scavenging ratio |
| 445 | Determine target scavenging ratio |
| 450 | Determine difference between the observed scavenging ratio and target scavenging ratio |
| 460 | Control engine operation |

The scavenging control routine 400 may be periodically executed during on-going engine operation, with execution including regular, periodic monitoring of various engine sensors to determine engine operating parameters including monitoring output of the exhaust gas sensor 40 to determine the exhaust gas parameter 41 of the exhaust gas feedstream, e.g., air/fuel ratio.

The % CO 412 may be determined based upon either direct CO measurement with an exhaust gas sensor, or CO predictions with algorithms, i.e., using a virtual sensor (410). The % CO 412 is employed to determine a value for in-cylinder lambda (in-cylinder-λ) 422 by interrogating a second calibration 300 (420). The second calibration 300 includes a first relationship between % CO and global-λ wherein the engine is operating without scavenging and a second relationship between % CO and global-λ wherein the engine is operating with scavenging. FIG. 3 shows one embodiment of the first relationship between % CO and global-λ wherein the engine is operating without scavenging 325 and a second relationship between % CO and global-λ wherein the engine is operating with scavenging 315.

Engine operating parameters including engine fueling, mass air flow and air/fuel ratio are monitored (425), and employed along with the in-cylinder-λ 422 to determine in-cylinder trapped air mass and scavenging air mass (430).

The in-cylinder trapped air mass for each cylinder may be calculated as follows (430):

$$M\_air\_local = M\_fuel * (\text{in-cylinder-}\lambda) * AFR\_stoich \quad [2]$$

wherein
M_air_local is the in-cylinder trapped air mass,
M_fuel is the fuel mass delivered to the cylinder per engine cycle,
in-cylinder-λ is the in-cylinder lambda value, and
AFR_stoich is the stoichiometric air/fuel ratio.

The scavenging air mass for each cylinder may be calculated as follows:

$$M\_air\_scavenging = M\_air\_global - M\_air\_local \quad [3]$$

wherein
M_air_scavenging is the scavenging air mass,
M_air_local is the in-cylinder trapped air mass, and
M_air_global is the fresh air mass delivered to the cylinder per engine cycle.

An observed scavenging ratio (scavenging ratio) 442 may be determined as a ratio between the scavenging air mass (M_air_scavenging) and the total in-cylinder air mass (M_air_global), as follows (440).

$$\text{Observed scavenging ratio} = M\_air\_scavenging / M\_air\_global \quad [4]$$

The observed scavenging ratio 442 is determined based upon the foregoing parameters including the scavenging air mass, the in-cylinder trapped air mass, and the total in-cylinder air mass. Each of the parameters may be directly measured, estimated from other measurements, predicted or otherwise determined, with variability caused by unmeasured or otherwise unaccounted environmental effects. Thus there may be variability in each of the parameters. Thus, the observed scavenging ratio 442 may have variability that may be taken into consideration in the engine controls in order to prevent commanding engine operation in an undesirable engine operation range.

Figures 1, 5:
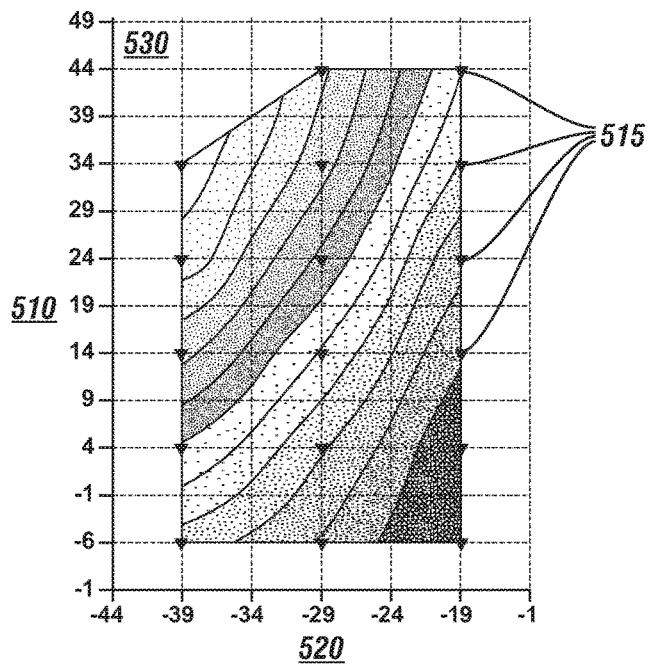
Figures 2, 5:
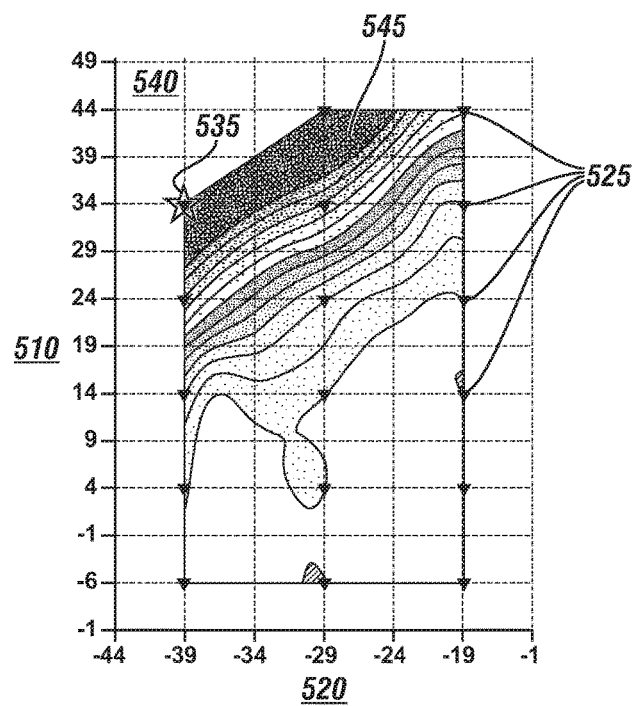

A target scavenging ratio 444 may be determined by interrogating a third calibration 500 (444). The third calibration 500 takes into consideration an engine operating point including a relationship between exhaust cam phasing, intake cam phasing, engine torque output and an associated scavenging ratio for the embodiment of the engine 10. FIGS. 5-1 and 5-2 show engine torques 530 and associated scavenging ratios 540 for ranges of exhaust cam phasings and intake cam phasings for one engine operating speed that can be developed as part of the third calibration 500 for one embodiment of the engine 10.

FIG. 5-1 graphically shows magnitude of engine torque 530 in relation to intake cam phasing 520 and exhaust cam phasing 510 for an embodiment of the engine 10 described with reference to FIG. 1. A plurality of iso-torque lines 515 are indicated. The intake cam phasing 520 increasingly retards, i.e., approaches TDC moving from left to right on the horizontal axis. The exhaust cam phasing 510 increasingly advances, i.e., moves away from TDC moving from top to bottom on the vertical axis. The magnitude of the engine torque 530 increases with movement from the lower-right corner to the upper-left corner.

FIG. 5-2 graphically shows magnitude of a scavenging ratio 540 in relation to intake cam phasing 520 and exhaust cam phasing 510 for an embodiment of the engine 10 described with reference to FIG. 1, and corresponding to the results shown with reference to FIG. 5-1. A plurality of iso-scavenging ratio lines 525 are indicated. The intake cam phasing 520 increasingly retards, i.e., approaches TDC moving from left to right on the horizontal axis. The exhaust cam phasing 510 increasingly advances, i.e., moves away from TDC moving from top to bottom on the vertical axis. The magnitude of the engine scavenging ratio 540 increases with movement from the lower-right corner to the upper-left corner. A best torque point 535 is indicated. A portion of the results, indicated by area 545, is an area of engine operation having an engine scavenging ratio 540 that is desirable for improving combustion and maximizing engine torque output. The best torque point 535 is preferably a maximum engine torque output that may be limited based upon constraints associated with thermal and mechanical capability of the engine hardware and the exhaust gas purifiers as shown in FIG. 5-1. The limitation on the maximum engine torque output may include introducing safety factors into selecting the best torque point 535 to prevent commanding engine operation in an engine operation range that may adversely affect service life, with such engine operation caused by variability that may be introduced when determining the parameters associated with determining the observed scavenging ratio 442.

Referring again to FIG. 4, the third calibration 500 can be employed to select the target scavenging ratio 444, which is a magnitude of a scavenging ratio that maximizes engine torque without attendant undesirable engine operation (445).

The target scavenging ratio 444 is compared with the observed scavenging ratio 442 (450) to determine a scavenging control parameter 452, with such comparison in the form of any suitable arithmetic comparator, e.g., by calculating an arithmetic difference or calculating a ratio.

The engine 10 is controlled based upon the comparison of the observed scavenging ratio 442 and the target scavenging ratio 444 (460). At its most basic control, this includes controlling openings of the intake valves 20 in relation to closings of the exhaust valves 18 to achieve the target scavenging ratio 444, with the observed scavenging ratio 442 employed as a feedback term or a feed-forward term in a control routine. This may include employing the scavenging control parameter 452 to adjust intake and/or exhaust cam phasings to achieve preferred engine torque output that balances fuel consumption, emissions, hardware protection, and engine torque output.

In this manner, executing the scavenging control routine 400 as part of controlling engine operation may result in improved combustion phasing and increased engine torque under low-speed, high-load conditions, e.g., in response to a wide-open-throttle (WOT) command. Thus, scavenging may be employed to enhance engine operation at low engine speeds with associated low engine airflow when requesting a higher torque from the engine.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating an internal combustion engine including a variable cam phasing system, the method comprising:
   determining an observed carbon monoxide (CO) ratio in an exhaust gas feedstream;
   determining an observed in-cylinder scavenging ratio based upon the magnitude of CO in the exhaust gas feedstream; and
   controlling, by a controller, control states for the variable cam phasing system to control opening times of engine intake valves in relation to closing times of engine exhaust valves based upon the observed in-cylinder scavenging ratio.

2. The method of claim 1, wherein determining the magnitude of CO in the exhaust gas feedstream comprises determining an amount of CO in the exhaust gas feedstream as a percent of the exhaust gas feedstream.

3. The method of claim 1, wherein determining a magnitude of CO in an exhaust gas feedstream comprises determining a magnitude of CO in an exhaust gas feedstream employing one of an exhaust gas sensor and a virtual sensor.

4. The method of claim 1, wherein determining an observed in-cylinder scavenging ratio based upon the observed CO in the exhaust gas feedstream comprises:
   determining an in-cylinder lambda based upon the magnitude of CO in the exhaust gas feedstream;
   determining an in-cylinder trapped air mass and a scavenging air mass based upon the in-cylinder lambda; and
   determining the observed scavenging ratio based upon the scavenging air mass.

5. The method of claim 4, wherein determining the in-cylinder trapped air mass comprises:
   determining an amount for fuel delivered to the cylinder, the in-cylinder lambda, and a stoichiometric air/fuel ratio; and
   determining the in-cylinder trapped air mass based upon the amount for fuel delivered to the cylinder, the in-cylinder lambda, and a stoichiometric air/fuel ratio.

6. The method of claim 4, wherein determining the scavenging air mass comprises:
   determining the in-cylinder trapped air mass;
   determining a fresh air mass delivered to the cylinder per engine cycle; and
   determining the scavenging air mass based upon a difference between the total air mass and the in-cylinder trapped air mass.

7. The method of claim 1, wherein controlling the control states for the variable cam phasing system to control opening times of engine intake valves in relation to closing times of engine exhaust valves based upon the observed in-cylinder scavenging ratio further comprises adjusting intake and exhaust cam phasings based upon the observed in-cylinder scavenging ratio.

8. The method of claim 7, wherein adjusting the intake and exhaust cam phasings based upon the observed in-cylinder scavenging ratio further comprises:
   determining a target in-cylinder scavenging ratio; and
   adjusting the intake and exhaust cam phasings based upon the observed in-cylinder scavenging ratio and the target in-cylinder scavenging ratio.

9. The method of claim 8, wherein determining the target in-cylinder scavenging ratio comprises selecting a target in-cylinder scavenging ratio that maximizes engine torque output.

10. A method for operating an internal combustion engine including intake valves and exhaust valves having variably controllable opening and closing times, the method comprising:
    determining an amount of carbon monoxide (CO) in an exhaust gas feedstream;
    determining an observed in-cylinder scavenging ratio based upon the amount of CO in the exhaust gas feedstream; and
    controlling, by a controller, openings of the intake valves in relation to closings of the exhaust valves based upon the observed in-cylinder scavenging ratio and a target in-cylinder scavenging ratio.

11. The method of claim 10, wherein determining an observed in-cylinder scavenging ratio based upon the amount of CO in the exhaust gas feedstream comprises:
    determining an in-cylinder lambda based upon the amount of CO in the exhaust gas feedstream;
    determining an in-cylinder trapped air mass and a scavenging air mass based upon the in-cylinder lambda; and
    determining the observed scavenging ratio based upon the scavenging air mass.

12. The method of claim 11, wherein determining the in-cylinder trapped air mass comprises:
    determining an amount for fuel delivered to the cylinder, the in-cylinder lambda, and a stoichiometric air/fuel ratio; and
    determining the in-cylinder trapped air mass based upon the amount for fuel delivered to the cylinder, the in-cylinder lambda, and a stoichiometric air/fuel ratio.

13. The method of claim 11, wherein determining the scavenging air mass comprises:
    determining the in-cylinder trapped air mass;
    determining a fresh air mass delivered to the cylinder per engine cycle; and
    determining the scavenging air mass based upon a difference between the total air mass and the in-cylinder trapped air mass.

14. The method of claim 13, wherein controlling openings of the intake valves in relation to closings of the exhaust valves based upon the observed in-cylinder scavenging ratio and a target in-cylinder scavenging ratio comprises adjusting intake and exhaust cam phasings of a variable cam phasing system based upon the observed in-cylinder scavenging ratio.

15. The method of claim 14, wherein openings of the intake valves in relation to closings of the exhaust valves based upon the observed in-cylinder scavenging ratio and a target in-cylinder scavenging ratio comprises increasing valve overlap between the closing of the exhaust valves and the openings of the intake valves to increase the scavenging ratio and decreasing valve overlap between the closing of the exhaust valves and the openings of the intake valves to decrease the scavenging ratio.

16. A multi-cylinder internal combustion engine, comprising:
    an intake cam phaser and an exhaust cam phaser;
    a plurality of actuators and a plurality of sensors;
    a controller including executable routines, the routines including:
        determining an amount of carbon monoxide (CO) in an exhaust gas feedstream;

determining an observed in-cylinder scavenging ratio based upon the amount of CO in the exhaust gas feedstream; and controlling the intake cam phaser and the exhaust cam phaser based upon the observed in-cylinder scavenging ratio and a target in-cylinder scavenging ratio.

17. The multi-cylinder internal combustion engine of claim 16, wherein the controller including executable routines including determining an observed in-cylinder scavenging ratio based upon the amount of CO in the exhaust gas feedstream comprises the control including executable routines including:

determining an in-cylinder lambda based upon the magnitude of CO in the exhaust gas feedstream;

determining an in-cylinder trapped air mass and a scavenging air mass based upon the in-cylinder lambda; and determining the observed scavenging ratio based upon the scavenging air mass.

18. The multi-cylinder internal combustion engine of claim 17, wherein the controller including executable routines including determining the in-cylinder trapped air mass comprises the controller including executable routines including:

determining an amount for fuel delivered to the cylinder, the in-cylinder lambda, and a stoichiometric air/fuel ratio; and determining the in-cylinder trapped air mass based upon the amount of fuel delivered to the cylinder, the in-cylinder lambda, and a stoichiometric air/fuel ratio.

19. The multi-cylinder internal combustion engine of claim 17, wherein the controller including executable routines including determining the scavenging air mass comprises the controller including executable routines including:

determining the in-cylinder trapped air mass;

determining a fresh air mass delivered to the cylinder per engine cycle; and determining the scavenging air mass based upon a difference between the total air mass and the in-cylinder trapped air mass.

20. The multi-cylinder internal combustion engine of claim 17, wherein the controller including executable routines including controlling the intake cam phaser and the exhaust cam phaser based upon the in-cylinder scavenging ratio and a target in-cylinder scavenging ratio comprises the controller including executable routines including:

adjusting intake and exhaust cam phasings based upon the observed in-cylinder scavenging ratio, wherein adjusting the intake and exhaust cam phasings based upon the magnitude of in-cylinder scavenging includes:

determining a target in-cylinder scavenging ratio; and adjusting the intake and exhaust cam phasings based upon the observed in-cylinder scavenging ratio and the target in-cylinder scavenging ratio.

\* \* \* \* \*